(12) United States Patent
Mahajan

(10) Patent No.: US 9,389,129 B2
(45) Date of Patent: Jul. 12, 2016

(54) DEVICE FEEDBACK SENSOR TESTING METHODOLOGY FOR HUMIDITY AND TEMPERATURE PROBES

(76) Inventor: Kamal Mahajan, Greenlawn, NY (US)

(*) Notice: Subject to any disclaimer, the term of this patent is extended or adjusted under 35 U.S.C. 154(b) by 874 days.

(21) Appl. No.: 13/304,502

(22) Filed: Nov. 25, 2011

(65) Prior Publication Data

US 2013/0138379 A1    May 30, 2013

(51) Int. Cl.
- *G01K 1/02*   (2006.01)
- *G01R 1/04*   (2006.01)
- *G06F 3/01*   (2006.01)
- *G06F 3/02*   (2006.01)
- *G01K 15/00*  (2006.01)

(52) U.S. Cl.
CPC ................ *G01K 15/007* (2013.01)

(58) Field of Classification Search
CPC ....................................... G01K 11/00
USPC .............. 702/24, 99, 119, 179, 183, 185; 73/29.01; 62/125
See application file for complete search history.

(56) References Cited

U.S. PATENT DOCUMENTS

| | | | |
|---|---|---|---|
| 5,259,593 A * | 11/1993 | Orme et al. | 266/78 |
| 6,085,576 A * | 7/2000 | Sunshine et al. | 73/29.01 |
| 6,182,453 B1 * | 2/2001 | Forsberg | 62/125 |
| 6,422,061 B1 * | 7/2002 | Sunshine et al. | 73/29.01 |
| 2004/0244382 A1 * | 12/2004 | Hagen et al. | 60/775 |
| 2010/0192596 A1 * | 8/2010 | Quisenberry et al. | 62/3.2 |

* cited by examiner

*Primary Examiner* — Gregory J Toatley
*Assistant Examiner* — Felix Suarez
(74) *Attorney, Agent, or Firm* — Bernard S. Hoffman

(57) ABSTRACT

An embodiment of the present invention is an algorithmic method for testing performance characteristics of humidity and temperature probes, i.e., accuracy, stability, and repeatability of humidity and temperature sensor probes over a user selected dynamic range, which is programmable by an end user. Further, the testing is accomplished and completed by using a specially designed humidity and temperature test chamber that is traceable to NIST (National Institute of Science and Technology). Ongoing, and final, testing results are made visible for study by the end user via a computer display, and there is printout availability. Further, testing in the chamber utilizes a method for probe attachment to the chamber and control thereof.

36 Claims, 7 Drawing Sheets

DEVICE FEEDBACK SENSOR TESTING METHODOLOGY FOR HUMIDITY AND TEMPERATURE PROBES

BACKGROUND OF THE INVENTION

The field of humidity and temperature probe testing, and consequently probe calibration, is currently occupied with methodologies of testing specific probes that are germane, as probe specific to a product humidity/temperature test chamber device. This is problematic when a user of the humidity/temperature chamber wants or is asked, to perform tests on probes foreign to the specific chamber.

Further, the field is represented by only a few companies, such as, humidity/temperatures chambers manufactured and marketed by Rotronics of Switzerland. These products are probe specific, and cater only to the sensor probes manufactured by the parent company. The present invention also teaches a capability of performing probe sensor testing on any type of probe that may, or may not, be specifically designed for a particular chamber that is germane to the present invention's humidity chamber device.

SUMMARY OF THE INVENTION

The present invention relates to an environmental humidity and temperature test chamber system and methodology for providing a precise, accurate, and convenient method for an end user to test a variety and a plurality of humidity and temperature probes that may, or may not, be germane to the present invention's humidity/temperature test chamber environment.

The present invention teaches a precise and accurate test method that is available via both the present invention's open-loop test probe algorithmic device and the present invention's closed-loop environment test chamber with controlled relative humidity and temperature apparatus.

The present invention also teaches the capability of performing probe sensor testing on any type of probe that may, or may not, be specifically designed for a particular chamber that is germane to the present invention's humidity chamber device.

The preferred embodiments of the present invention utilize an algorithmic method for a designated ramping up and down of both relative humidity and temperature ranges set by an operator—but not limited to a ramp configuration—for a specific probe test set of parameters that are congruent with the probe.

A further object of an embodiment of the present invention is the capability of accommodating a plurality of current-actuated and voltage-actuated probes.

Another object of an embodiment of the present invention is to provide data transfer and instant updating to an external computer device for a screen display of test chamber internal relative humidity and temperature readings from a NIST (National Institute of Science and Technology) traceable system probe, which is displayed and referenced against a screen-displayed set of probe-under-test relative humidity and temperature parameters. Further, the parameter test proceedings can be accessed as a printout copy.

Another object of the present invention is that the external computer runs the desired end user experiments and controls the test chamber relative humidity and temperature parameters as well as reading the DFB (device Feed Back) test probe data and records it.

Another object of the present invention is to provide precise maintaining of chamber generated relative humidity and temperature conditions within the internal test chamber compartment, with a minimum of parameter drift. This feature, combined with the high speed relative humidity and temperature parameter adjustment and detection, allows for accurate test data reading and recording; an all important feature when production line testing is introduced.

DETAILED DESCRIPTION OF THE DRAWINGS AND EMBODIMENTS

The following detailed description is of the best currently contemplated modes of carrying out exemplary embodiments of the present invention. The description is not to be taken in a limiting sense, but is made merely for the purpose of illustrating the general principles of the present invention, since the scope of the present invention is best described by the appended claims.

Figure 1:
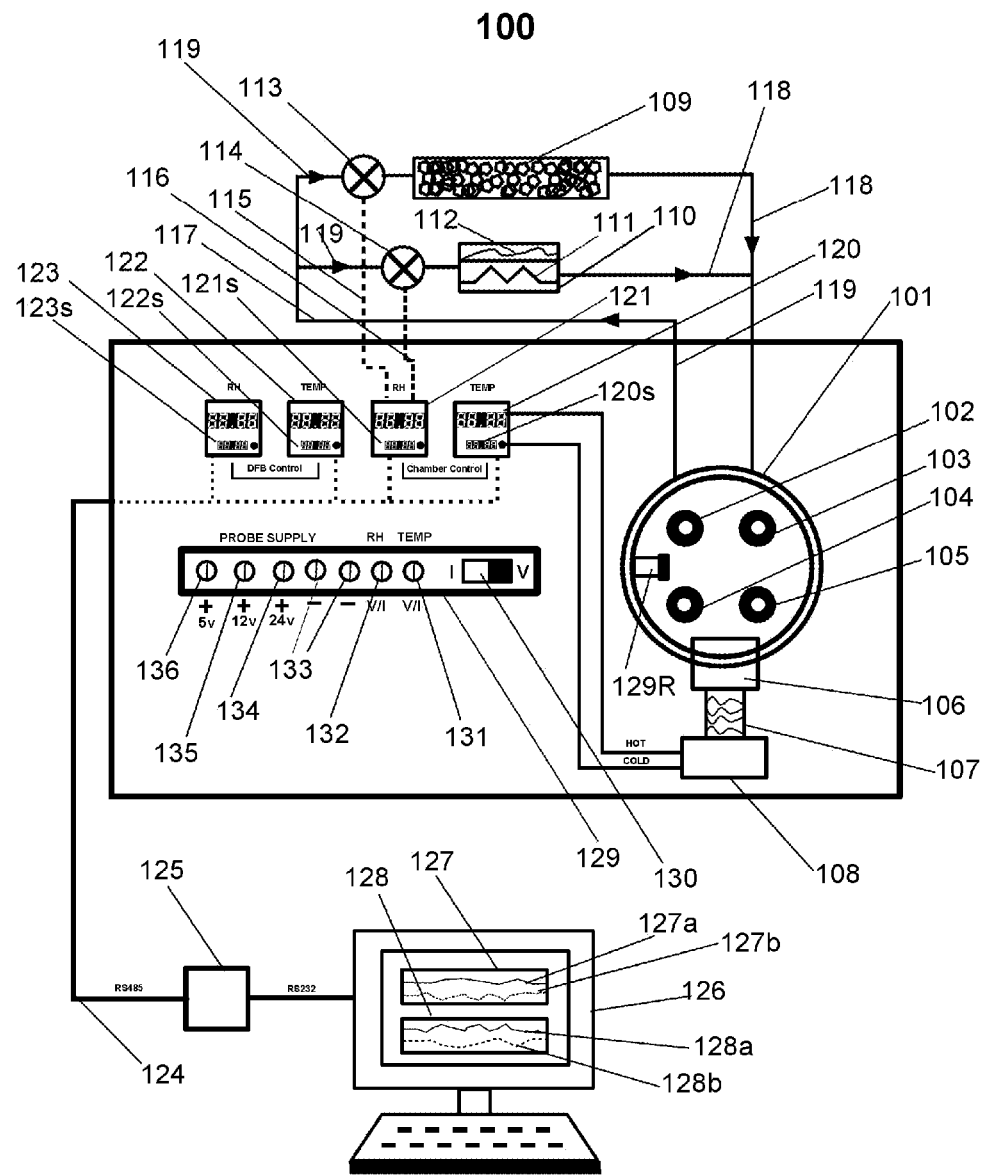
FIG. 1 is a block diagram of the main embodiment of the present invention.

An embodiment of the present invention 100 is shown in FIG. 1. A strategically placed internal relative humidity and temperature controlled and fixed volume air test chamber compartment 101 is situated within a system enclosure, along with all electrical and electronic components and other hardware devices. The internal test chamber device 101 contains, and is in communication with, a NIST (National Institute of Science and Technology) traceable reference probe sub system device 129R for relative humidity and temperature referencing. Further, there is an external window that contains a plurality of probe entry orifices that are air sealed-upon-entry type 102, 103, 104, 105, each can receive, and is in communication with, a test probe or a plurality of test probes into the test chamber 101. Another component device in thermal communications with the test chamber 101 is a Peltier, but not limited to a Peltier device. A thermal transfer device 106 is in thermal communication with the test chamber 101 and a heat sink 107, and in electrical communication with the Peltier, but not limited to a Peltier device, device driver 108. The Peltier, but not limited to a Peltier device, device is also in communication with a test chamber temperature readout 120 and an external computer 126 via an RS485 (RS-485, Recommended Standard for electrical characteristics of drivers and receivers for use in balanced digital multipoint systems) data connection bus 124, which is converted to an RS232 (RS-232, Recommended Standard for serial communication transmission of data) serial bus information by a converter 125.

The present invention 100 utilizes a device that precisely generates and maintains a constant or varying end user designated relative humidity and temperature setting or range, respectively. The device for precisely generating and maintaining a constant or varying end user designated relative humidity range comprises a desiccate container 109 and an associated air pump 113 in communication with the desiccate container 109, which together comprise an air dryer device 109 and 113. In addition to the air dryer 109 and 113, a humidifier comprises a heating element 111 in thermal communication with a water reservoir 112, which in turn is in communication with an air pump 114.

Further, in its operation to supply relative humidity levels upon command, the dryer 109 and the humidifier 110 are in communication with the test chamber 101 by an output conduit tubing 118 that feeds dry desiccated air into the test chamber 101 and air that contains water vapor from the humidifier 110 that is in communication with the test chamber 101 by an output conduit tubing 118. Air flow is fed back into the dryer 109 and the humidifier 110 by a feedback conduit tubing 119 that is in circuitous communication with the test chamber 101.

Further, the air pump 113 in communication with the desiccate container 109, and the air pump 114 in communication with the humidifier 110, are both in electrical communication with a control indicator 121 of the test chamber 101 and further, are sensed and in communication with the external computer 126 by way of algorithms. Both control indicators 121 of the test chamber 101 are equipped with set point controls 120s and 121s to manually set limits and monitor a control setting for a particular relative humidity and temperature range for the test chamber 101.

A humidity or temperature probe device is connected to, and is in communication with, the externally situated probe supply terminal strip 129. The terminal strip 129 offers a source of 5 volts positive potential at a screw-on section 136, a source of 12 volts positive potential at a screw-on section 135, a source of 24 volts positive potential at a screw-on section 134, and a negative potential at a screw-on section 133 for the test probe connection. The power screw-on connections 136, 135, and 134 of the probe supply terminal 129 are for powering various probes under test. There are provisions of screw-on sections for a relative humidity probe or a temperature probe at screw-on terminal sections 131 and 132 that are for either a voltage-actuated probe or a current-actuated probe. The selection for the screw-on sections 131 and 132 for voltage or current is determined by a selector switch 130. A probe under test is in communication with the terminal strip 129. The terminal strip 129 is in communication with the external computer 126 by an RS485 data bus 124 and a bus converter 125 that converts the RS485 data bus 124 to an RS232 serial data for computer entry and storage. The probe under test is in communication with probe data feedback indicators 122 and 123 simultaneously for instant data indication and updating. The probe data feedback indicators 122 and 123 are equipped with set point controls 122s and 123s to manually set and monitor a control setting limit for a particular relative humidity and temperature range for a user designated test procedure.

The external computer 126 is used to control the test chamber system 101 in a probe under test "open loop" manner. It commands the test chamber 101 to go to a specific temperature and relative humidity range. The user defines an experiment on the external computer 126, which has one of a plurality of phases. The user selects an experiment to run, and the computer executes it. Each phase of an experiment defines a start, a stop, a step, and a delta time for a temperature and relative humidity range. There are additional parameters that define whether a performance report is generated at the conclusion of each phase and/or at the conclusion of an experiment.

Experiments may also be run as a probe under test "open loop" where at the conclusion of the last phase the system repeats with the first phase. The experiments and their associated phases are stored in a database on the external computer 126. Convenient end user visualization of test parameters and time plots are available on the external computer 126 by a windowed screen environment 127 and 128 for test chamber plots and parameters 127a and 128a and probe time plots and parameters 127b and 128b.

Figure 1A:
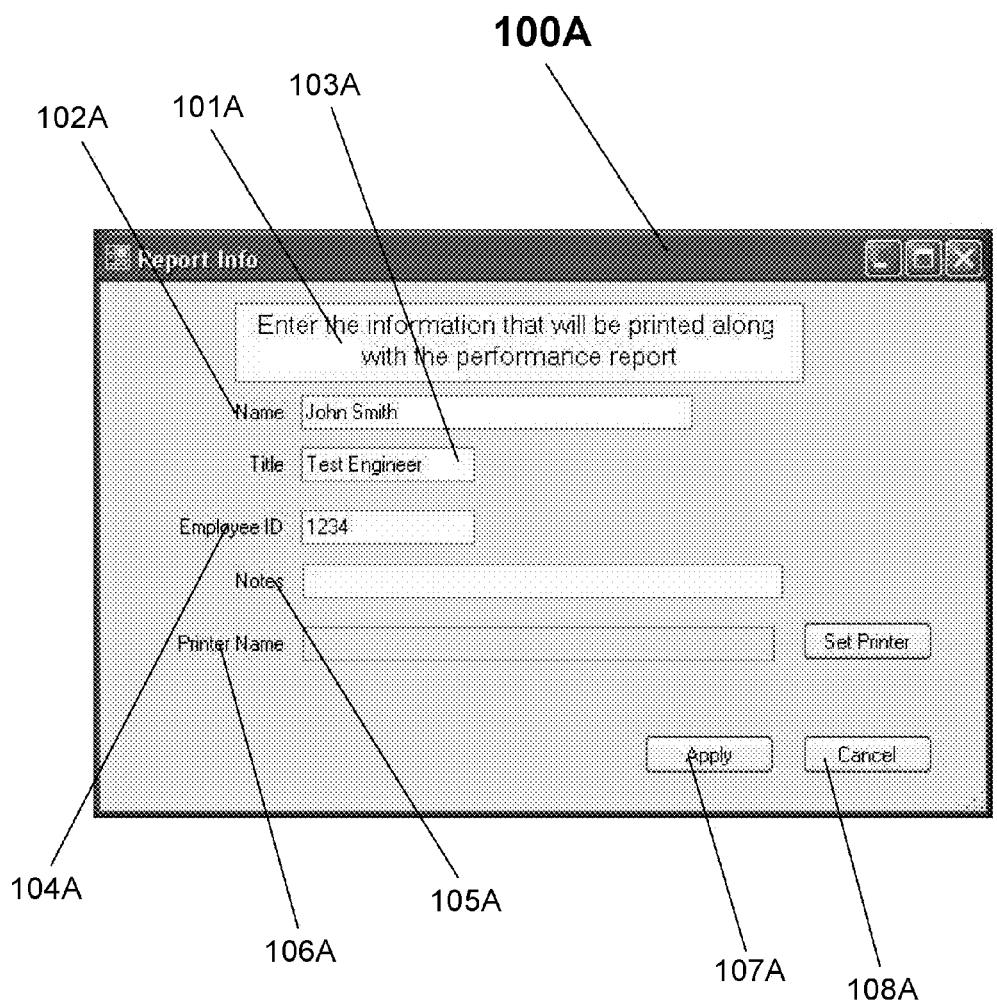
FIG. 1A shows initial computer screen window test report user input information.
Figure 2:
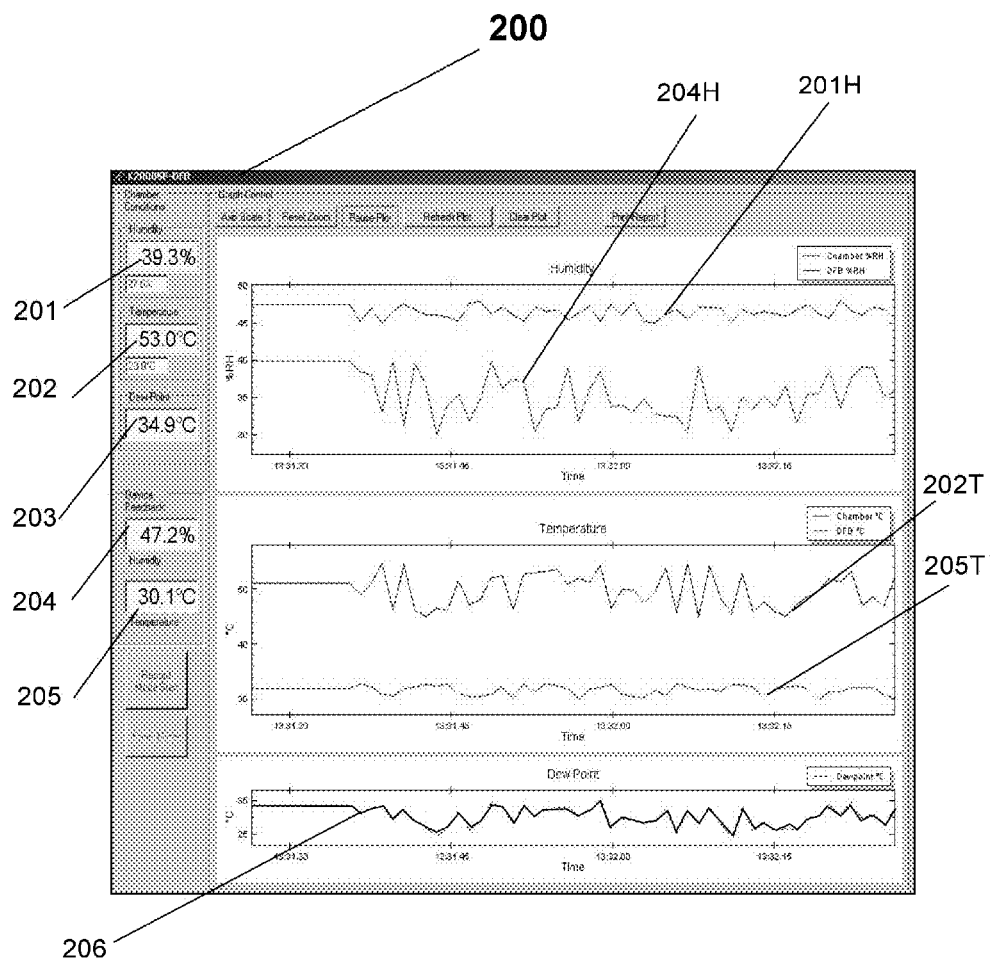
FIG. 2 shows a typical test computer screen window of chamber RH and T parameters and device feedback probe parameters as well as chamber dew point condition, both as instantaneous numerical values and as graphical time plots.

A particular set of embodiments that are algorithms for the present invention is described as a windowed/menu environment that flows through a sequential set of windowed program instructions with user-designated data entry. FIG. 1A is a report window 100A for defining a user name 102A, a job title 103A, an employee ID 104A, specific reference notes 105A, and a printer name 106A, after which either an apply tick box 107A or a cancel tick box 108A can be selected. Once the apply tick box is selected, the sequence progresses as illustrated in FIG. 2 as a main data monitoring window 200 for monitoring all test chamber instant and current temperature 202 and instant and current relative humidity conditions 201, as well as a test chamber temperature time plot 202T and a test chamber relative humidity time plot 201H.

Further, the main data monitoring window 200 for monitoring all probe under test instant and current temperature 205 and instant and current relative humidity conditions 204 as well as probe under test temperature time plot 205T and probe under test relative humidity time plot 204H. A calculation and displayed time plot 206 for the dew point within the test chamber 101 is also part of the algorithm embodiment.

Figure 3:
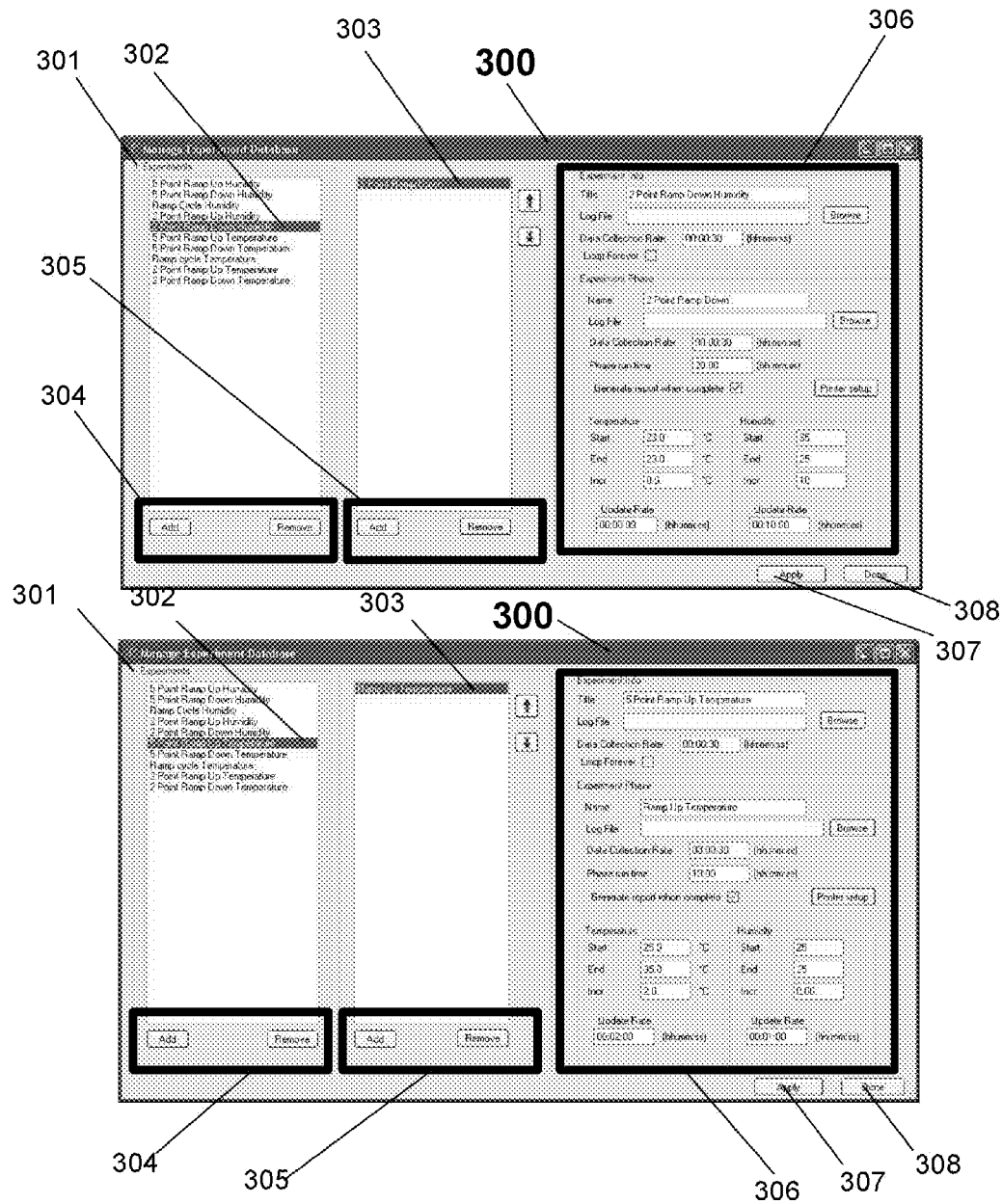
FIG. 3 shows two different typical end user parameter range test programs entered and displayed in a computer screen window.

The windowed user designated database information parameter settings and accumulated database library is featured in FIG. 3, where two test parameter program runs 300 are compared with available differences for reference illustration. Initially the user has the option of typing in a windowed set of specific test parameters 306 designated as pertinent to the probe under test and further ticking the apply box 307 and done box 308 that in addition stores the parameter set in the parameter library 301, or the user can select a parameter set 302 from the experiment history library 301. The experiment history library 301 is accumulated from previous user experiments that have been entered in the test parameter window section 306. Once a user-designated parameter set 302 is selected, the add/remove tick box 304 can transfer the parameter name 302 to a test 303 selected command section 305. Selecting the add will enable that selection to be utilized by the algorithm embodiment.

Figure 4:
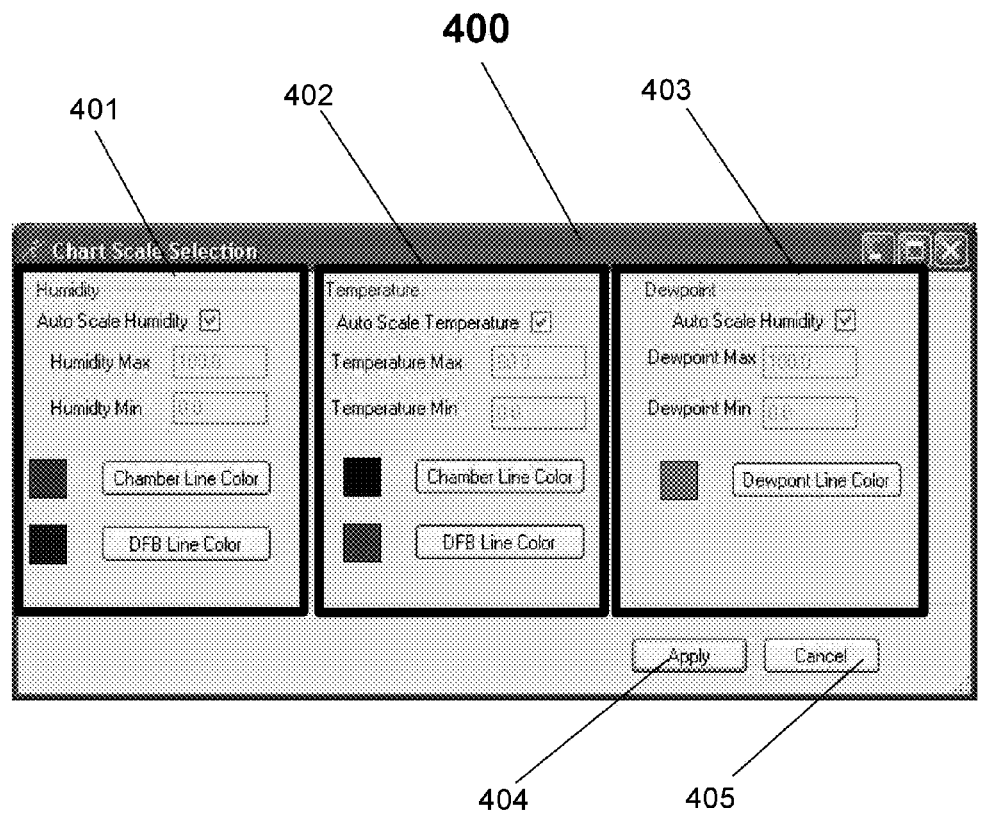
FIG. 4 shows a screen window chart scale selection parameter set, which is chosen by an end user.

As shown in FIG. 4, where a user defined chart scale and time plot line color selection window 400 has a humidity scale and color selection section 401, a temperature scale and color selection section 402, and a dew point scale and color selection section 403. After selection, an apply tick box 404 enables and stores the selection or the selection can be canceled in a cancel box 405.

Figure 5:
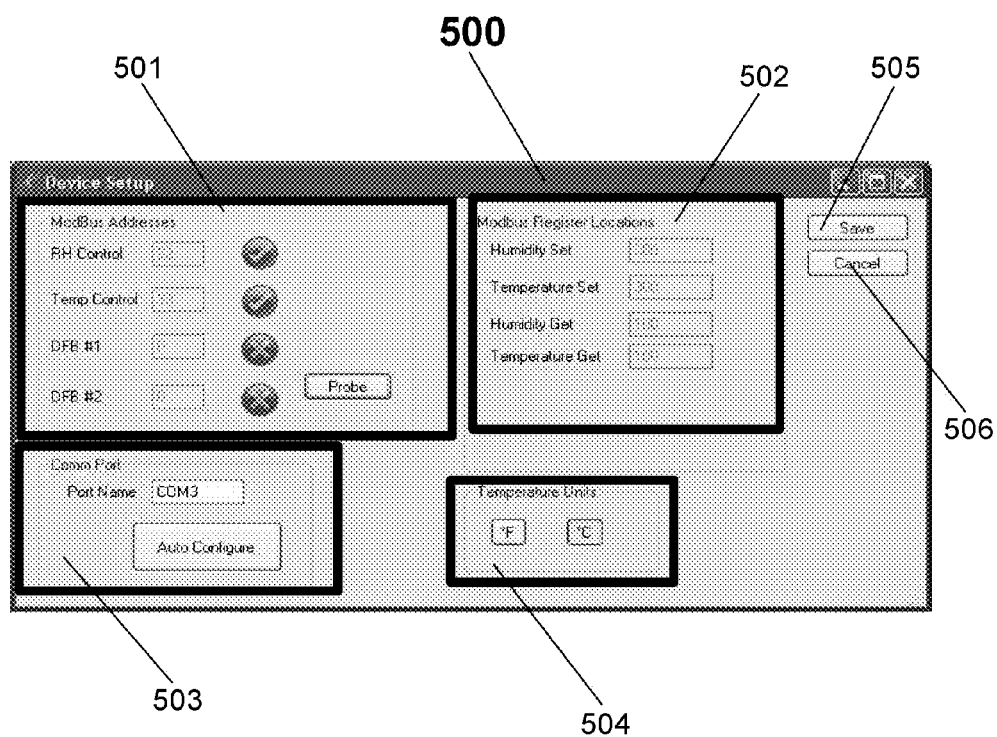
FIG. 5 shows a computer screen window of an end user device set up selection for interfacing to a computer.

FIG. 5 shows the featured window for device setup, which includes selection for a modbus addresses 501, modbus register locations 502, a comm. port configure 503, and a temperature unit selection of either degrees F. or degrees C. 504. Post selection for a save 505 or a cancel 506 is determined by the end user.

Figure 6:
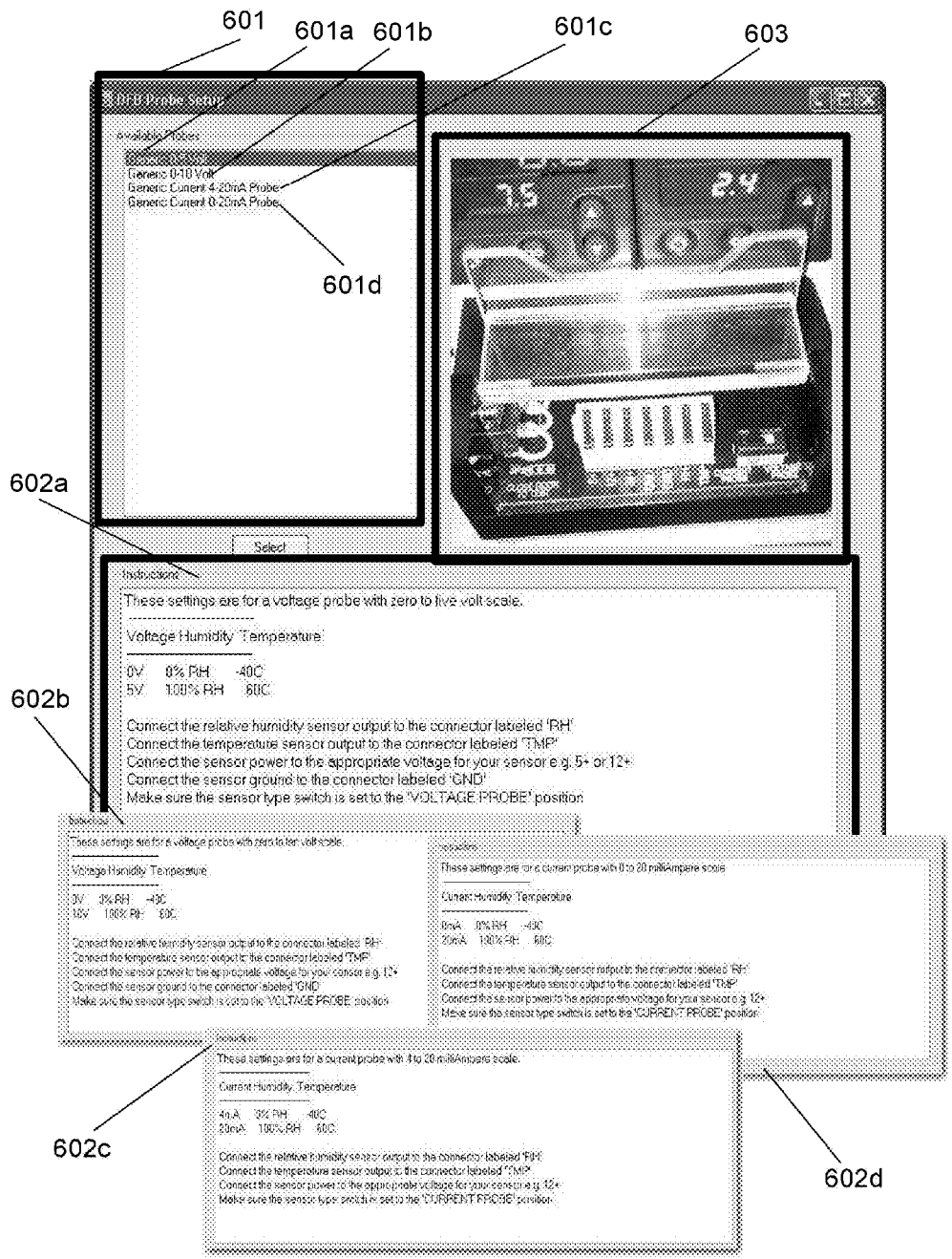
FIG. 6 shows a computer screen window that is the end user selected data feedback probe set up and instruction set for probe connection.

FIG. 6 details a DFB (data feedback) probe under test setup window 600 for a plurality of selections for a plurality of available temperature and humidity probe products. Available stored library 601 probe setup settings are for probe specific or as shown, generic parameter settings for a voltage-actuated probe of zero to 5 volt scale (highlighted as selected) 601*a*, generic parameter settings for a voltage-actuated probe of zero to 10 volt scale 601*b*, generic parameter settings for a current-actuated probe of 4 to 20 mA scale 601*c*, and generic parameter settings for a current actuated probe of zero to 20 mA scale 601*d*. Detailed connection instructions for generic probes setup 601 are provided in an associated 0 to 5 volt windowed section 602*a*, an associated 0 to 10 volt windowed section 602*b*, an associated 4 to 20 mA windowed section 602*c*, and an associated 0 to 20 mA section 602*d*.

Regarding the voltage humidity temperature setting parameters 602*a* for the 0 to 5 volt generic voltage-actuated probe, 0 volts represents 0% RH and −40 C, and 5 volts represents 100% RH and 60 C.

Regarding the voltage humidity temperature setting parameters 602*b* for the 0 to 10 volt generic voltage-actuated probe, 0 volts represents 0% RH and −40 C, and 10 volts represents 100% RH and 60 C.

Regarding the voltage humidity temperature setting parameters for the 4 to 20 mA generic current-actuated probe, 4 mA represents 0% RH and −40 C, and 20 mA represents 100% RH and 60 C.

Regarding the voltage humidity temperature setting parameters for the 0 to 20 mA generic current-actuated probe, 0 mA represents 0% RH and −40 C, and 20 mA represents 100% RH and 60 C.

The present invention has been described in an illustrated manner and it is to be understood that the terminology employed is intended to be used in the nature of words of description rather than of limitation. Obviously, many modifications and variations of the present invention are possible in light of the above teachings. It is, therefore, to be understood that within the scope of the appended claims wherein reference numerals are merely for convenience and are not to be in any way limiting, the present invention may be practiced otherwise than as specifically described.

The invention claimed is:

1. A device for performing probe sensor testing on any type of humidity and temperature probe sensor that may or may not be specifically designed for a particular chamber that is germane to said device, comprising:
   a) an enclosure;
   b) a probe interface;
   c) a computer;
   d) a database;
   e) a thermal transfer device; and
   f) a test chamber temperature readout;
   wherein said enclosure contains a test chamber;
   wherein said probe interface is operatively connected to said enclosure;
   wherein said probe interface is for powering the any type of humidity and temperature probe under test;
   wherein said computer is external to said enclosure;
   wherein said computer commands said test chamber of said enclosure to go to a specific temperature and relative humidity range;
   wherein said database is contained in said computer;
   wherein said database stores parameter settings for all of the any type of humidity and temperature probe sensors so as to allow the all of the any type of humidity and temperature probe sensors that may or may not be specifically designed for the particular chamber that is germane to said device to be tested by said device;
   wherein said computer utilizes computer algorithms with a windowed environment a data bus for data transfer to, and from, said test chamber of said enclosure;
   wherein said thermal transfer device is in thermal communication with said test chamber of said enclosure;
   wherein said thermal transfer device is a Peltier device; and
   wherein said test chamber temperature readout is in communication with said thermal transfer device and said computer via said data connection bus.

2. The device of claim 1, further comprising:
   a) a closed-loop computer algorithm for said test chamber of said enclosure; and
   b) an open-loop computer algorithm for the probe-under-test.

3. The device of claim 1, further comprising a plurality of probe insert orifices; wherein said plurality of probe insert orifices are air-tight-sealed; and
   wherein said plurality of probe insert orifices are disposed on said enclosure.

4. The device of claim 1, further comprising a probe power and signal terminal strip;
   wherein said probe power and signal terminal strip is disposed on said enclosure; and
   wherein said probe power and signal terminal strip is for easy access for connecting the any type of humidity and temperature probe sensor to said device.

5. The device of claim 4, further comprising a selection switch;
   wherein said selection switch is disposed on said probe power and signal terminal strip device; and
   wherein said selection switch is for selection of a voltage-actuated or a current-actuated temperature and humidity probe to be tested.

6. The device of claim 4, further comprising at least one readout indicator; and
   wherein said at least one readout indicator is disposed on said enclosure.

7. The device of claim 6, wherein said at least one readout indicator is in communication with said computer for monitoring and data storage.

8. The device of claim 6, further comprising a desiccate container; and
   wherein said at least one readout indicator is in communication with said desiccate container.

9. The device of claim 8, further comprising an air pump;
   wherein said at least one readout indicator is in communication with said air pump; and
   wherein said air pump is in communication with said desiccate container.

10. The device of claim 6, further comprising a probe under test power supply; and
    wherein said at least one readout indicator is in communication with said probe under test power supply.

11. The device of claim 10, wherein said probe power and signal terminal strip, said probe under test power supply, and at least one readout indicator are in communication with said computer for setting parameter value input, monitoring, and data storage.

12. The device of claim 5, further comprising a plurality of probe supply voltages;
    wherein said a plurality of probe supply voltages are disposed on said probe power and signal terminal strip;
    wherein said plurality of probe supply voltages are in communication with said probe power and signal terminal strip; and
    wherein said plurality of probe supply voltages are for powering the any type of humidity and temperature probe sensor.

13. The device of claim 4, further comprising a plurality of voltage or current signal inputs;

wherein said plurality of voltage or current signal inputs are disposed on said probe power and signal terminal strip; and wherein said plurality of voltage or current signal inputs are in communication with said probe power and signal terminal strip.

14. The device of claim 1, further comprising a windowed user ID and miscellaneous report information; and wherein said windowed user ID and miscellaneous report information are for experiment record keeping.

15. The device of claim 1, further comprising a windowed composite test chamber temperature and relative humidity instant and current values and accumulated time plots;

wherein said windowed composite test chamber temperature and relative humidity instant and current values and accumulated time plots are for operator study, evaluation, and control.

16. The device of claim 15, wherein said accumulated time plots are stored; and wherein said accumulated time plots are made available for hard copy printouts.

17. The device of claim 1, further comprising a windowed composite probe-under-test temperature and relative humidity instant and current values and accumulated time plots;

wherein said windowed composite probe-under-test temperature and relative humidity instant and current values and accumulated time plots are for operator study and evaluation.

18. The device of claim 17, wherein said accumulated time plots are stored; and wherein said accumulated time plots are made available for hard copy printouts.

19. The device of claim 1, further comprising a dew point instant and current value and accumulated time plot;

wherein said dew point instant and current value and accumulated time plot are for operator study and evaluation.

20. The device of claim 17, wherein said time plot is stored; and wherein said time plot is made available for hard copy printout.

21. The device of claim 1, wherein said database receives a windowed environment data entry for test chamber control parameters either from an accumulated library database or an operator designated parameter data entry; and wherein said operator designated parameter data entry is stored as a database library entry.

22. The device of claim 1, further comprising an operator-designated or an auto scaling windowed time plot chart scale; and wherein said operator-designated or an auto scaling windowed time plot chart scale is for color identifying various time plot chart lines.

23. The device of claim 1, further comprising:
a) a data bus and a communication port entry; and
b) modbus register locations and temperature unit designated entry;

wherein said data bus and a communication port entry are for setup of said device; and wherein said modbus register locations and temperature unit designated entry are for setup of said device.

24. The device of claim 1, wherein temperature and relative humidity in said test chamber of said enclosure are controlled, monitored, and stored for data library accumulation by a set of commands from said computer.

25. The device of claim 1, wherein the any type of humidity and temperature probe sensor under test has its data values read, monitored, and stored in an open-loop apparatus, whereby said computer sends commands to receive, read, interpret, and record the any type of humidity and temperature probe sensor under test for study and evaluation.

26. The device of claim 1, further comprising a heat sink; and wherein said heat sink is in thermal communication with said thermal transfer device.

27. The device of claim 1, further comprising a converter.

28. The device of claim 9, further comprising:
a) a humidifier; and
b) water reservoir;

wherein said humidifier comprises a heating element;

wherein said heating element of said humidifier is in thermal communication with said water reservoir; and wherein said water reservoir is in communication with said air pump.

29. The device of claim 28, further comprising an output conduit tubing;

wherein said output conduit tubing provides communication between said humidifier and said test chamber of said enclosure; and wherein said output conduit tubing is for feeding dry desiccated air into said test chamber of said enclosure.

30. The device of claim 28, further comprising a feedback conduit tubing;

wherein said feedback conduit tubing is in communication with said humidifier and said test chamber of said enclosure; and wherein said feedback conduit tubing is for feeding back air to said humidifier.

31. The device of claim 28, wherein said test chamber of said enclosure has a feedback indicator;

wherein said air pump is in communication with said humidifier; and wherein said feedback indicator of said test chamber of said enclosure is in electrical communication with said desiccate container and said humidifier.

32. The device of claim 28, wherein said computer is in communication with said desiccate container and said humidifier by way of algorithms.

33. The device of claim 31, wherein said feedback indicator of said test chamber of said enclosure includes set point controls; and wherein said set point controls of said feedback indicator of said test chamber of said enclosure are for manually setting and monitoring a control setting limit for a particular relative humidity and temperature range for said test chamber of said enclosure.

34. The device of claim 12, wherein said plurality of probe supply voltages of said probe power and signal terminal strip include:
a) a 5 volt positive potential screw section of said probe power and signal terminal strip;
b) a 12 volt positive potential screw section of said probe power and signal terminal strip;
c) a 24 volt positive potential screw section of said probe power and signal terminal strip; and
d) a negative potential screw section of said probe power and signal terminal strip; and wherein said selection switch selects which screw section of said probe power and signal terminal strip is chosen.

35. The device of claim 1, wherein said computer includes a windowed screen environment; and wherein said windowed screen environment of said computer is for allowing a user to view test parameters and time plots.

36. The device of claim 1, wherein said parameter settings stored in said database for the all of the any type of humidity and temperature probe sensors are either inputted by a user or are inputted by experiments.

* * * * *